UNITED STATES PATENT OFFICE.

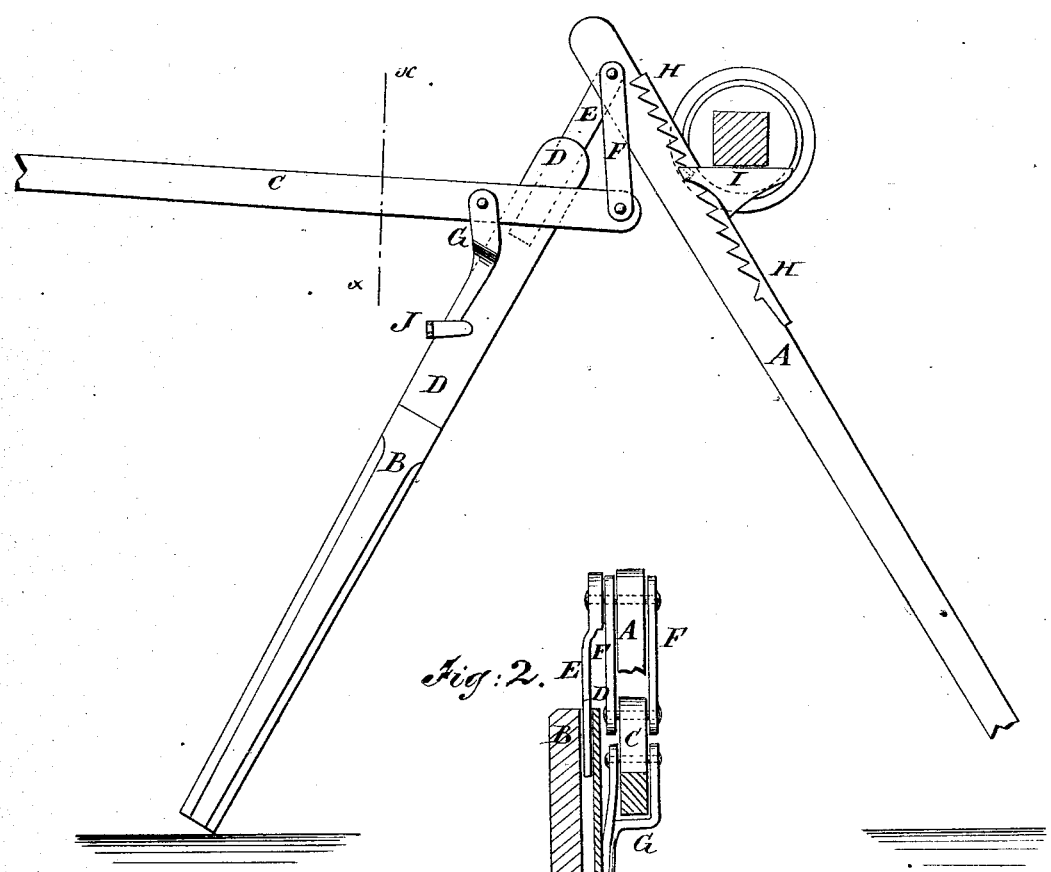

JOHN B. FAYETTE AND LORENZO MEEKER, OF OSWEGO, NEW YORK.

IMPROVEMENT IN LIFTING-JACKS.

Specification forming part of Letters Patent No. 163,647, dated May 25, 1875; application filed May 1, 1875.

*To all whom it may concern:*

Be it known that we, JOHN B. FAYETTE and LORENZO MEEKER, of Oswego, in the county of Oswego and State of New York, have invented a new and useful Improvement in Lifting-Jack, of which the following is a specification:

Figure 1 is a side view of our improved lifting-jack. Fig. 2 is a rear view of the same, the lever being shown in section through the line $x\ x$, Fig. 1, and part of the brace-bar being broken away.

Similar letters of reference indicate corresponding parts.

The object of this invention is to furnish an improved jack for raising wagons, carriages, carts, cars, locomotives, &c., and which shall be simple in construction, convenient in use, and powerful in operation.

The invention consists in the combination of the lifting-bar, the brace-bar, the lever, the socket-plate, the sliding bar, the connecting-bars, and the bracket with each other.

A is the lifting-bar. B is the brace-bar, and C is the lever. In one side of the upper part of the brace-bar B is made a groove, which is covered with a plate, D, to form a socket to receive the sliding guide-bar E, the upper end of which is pivoted to one side of the upper end of the lifting-bar A. To the opposite sides of the upper end of the lifting-bar A are pivoted the upper ends of two short connecting-bars, F, the lower ends of which are pivoted to the opposite sides of the forward end of the lever C. The lever C is pivoted at a little distance from its forward end to an arm or bracket, G, attached to the side of the upper part of the brace-bar B. To the forward side of the upper part of the lifting-bar A is attached a plate, H, the side edges of which are bent inward at right angles to overlap the sides of the said lifting-bar A, and have ratchet-teeth formed in them. I is a step to receive the axle of the wagon, or the object to be raised, and the base of which rests upon the plate H. The side edges of the base of the step I are bent down at right angles, or are flanged to overlap and fit upon the flanges of the plate H. The upper ends of the flanges of the step I project and have inwardly-projecting toes formed upon them to enter the teeth of the flanged plate H, to support the step I in any position into which it may be adjusted.

In using the jack, the free end of the lever C is raised, and the step I is adjusted to fit under the object to be raised. The jack is then placed beneath the object to be raised, and the free end of the lever C is drawn down, which raises the object. When the free end of the lever C has been lowered so far as to carry the pivot in the end of the said lever C past the straight line connecting the fulcrum of the lever C and the pivot in the end of the lifting-bar A, the said lever C strikes a stop, J, attached to the brace-bar B, and the jack is locked, holding the object raised. The object raised is again lowered when desired by means of the lever C.

Having thus described our invention, we claim as new and desire to secure by Letters Patent—

The combination of the lifting-bar A, the brace-bar B, the lever C, the socket-plate D, the sliding bar E, the connecting-bars F, and the bracket G with each other, substantially as herein shown and described.

JOHN B. FAYETTE.
LORENZO MEEKER.

Witnesses:
WILLIAM D. PARSONS,
LYMON COON.